United States Patent
Morley et al.

(10) Patent No.: US 8,762,287 B2
(45) Date of Patent: *Jun. 24, 2014

(54) METHOD FOR COMPLYING WITH EMPLOYMENT ELIGIBILITY VERIFICATION REQUIREMENTS

(75) Inventors: Elaine V. Morley, Bellaire, TX (US); John T. Andersen, Houston, TX (US)

(73) Assignee: Lookout Services, Inc., Houston, TX (US)

( * ) Notice: Subject to any disclaimer, the term of this patent is extended or adjusted under 35 U.S.C. 154(b) by 449 days.
This patent is subject to a terminal disclaimer.

(21) Appl. No.: 12/824,479

(22) Filed: Jun. 28, 2010

(65) Prior Publication Data

US 2010/0262553 A1    Oct. 14, 2010
US 2014/0052657 A9    Feb. 20, 2014

Related U.S. Application Data

(63) Continuation of application No. 10/779,274, filed on Feb. 13, 2004, now Pat. No. 7,747,542.

(51) Int. Cl.
| | |
|---|---|
| *G06Q 10/10* | (2012.01) |
| *G06Q 10/06* | (2012.01) |
| *G06Q 30/08* | (2012.01) |
| *G06Q 10/00* | (2012.01) |
| *G06Q 30/02* | (2012.01) |

(52) U.S. Cl.
CPC ................................. *G06Q 10/1053* (2013.01)
USPC .............................. 705/321; 705/1.1; 705/320

(58) Field of Classification Search
None
See application file for complete search history.

(56) References Cited

U.S. PATENT DOCUMENTS

| | | | |
|---|---|---|---|
| 5,046,005 | A | 9/1991 | Vilardebo et al. |
| 5,947,747 | A | 9/1999 | Walker et al. |
| 6,192,381 | B1 | 2/2001 | Stiegemeier et al. |
| 6,542,905 | B1 | 4/2003 | Fogel et al. |
| 6,618,734 | B1 | 9/2003 | Williams et al. |
| 6,957,227 | B2 | 10/2005 | Fogel et al. |
| 2002/0055937 | A1 | 5/2002 | Walther |
| 2002/0147607 | A1 | 10/2002 | Thakur et al. |

(Continued)

FOREIGN PATENT DOCUMENTS

| | | |
|---|---|---|
| JP | 09134117 | 5/1997 |
| JP | 2001283151 | 10/2001 |

OTHER PUBLICATIONS

United States Citizenship and Immigration Services Website, uscis.gov, pp. 1-39, Pub Date: Apr. 18, 2005.

(Continued)

*Primary Examiner* — Jonathan Ouellette
(74) *Attorney, Agent, or Firm* — Pramudji Law Group PLLC; Ari Pramudji

(57) ABSTRACT

A method is provided for determining employer compliance in determining employment eligibility requirements in accordance with federal immigration regulations. Compliance alerts and compliance tips are displayed for guiding employers in verifying employment eligibility. Completed employment eligibility forms are automatically audited to analyze whether the employer has accurately completed the employment verification. The completed forms are audited by applying various compliance rules to a completed employment eligibility form, presently a Form I-9, to determine compliance with the applicable regulations. A listing is provided of various errors and additional data required to complete the audited form. The method is preferably administered by a single service provider for multiple employers, to assure that changes in the applicable regulations are regularly incorporated. A central system is provided for managing all of the employment eligibility forms associated with particular employers, to assure continued compliance with federal regulations.

7 Claims, 5 Drawing Sheets

---

12

I-9 ADMINISTRATION SECTION

AUDIT A NEW I-9 DOCUMENT

ADD A NEW I-9 DOCUMENT

EXISTING I-9 DOCUMENTS SEARCH AND EDIT

INDIVIDUAL I-9 DOCUMENT SEARCH AND EDIT

(56) References Cited

U.S. PATENT DOCUMENTS

2003/0046287 A1 3/2003 Joe
2003/0097342 A1 5/2003 Whittingtom
2004/0216039 A1 10/2004 Lane et al.

OTHER PUBLICATIONS

"Benelytics Announces Tools to Automate I-9 Processing," PR Newswire, Sep. 10, 1997.

METHOD FOR COMPLYING WITH EMPLOYMENT ELIGIBILITY VERIFICATION REQUIREMENTS

CROSS-REFERENCE TO RELATED APPLICATIONS

This patent application is a continuation application of commonly owned U.S. patent application Ser. No. 10/779,274, filed Feb. 13, 2004 now U.S. Pat. No. 7,747,542, entitled "Method for Complying with Employment Eligibility Verification Requirements," by Elaine V. Morley and John T. Andersen, which claims priority to commonly owned U.S. patent application Ser. No. 09/918,092, filed Jul. 30, 2001, entitled "Method for Complying with Employment Eligibility Verification Requirements," by Elaine V. Morley and John T. Andersen, which itself claims priority to commonly owned U.S. Provisional Patent Application Ser. No. 60/222,117, filed Jul. 28, 2000, entitled "Method for Reviewing Compliance With Employer Eligibility Verification Requirements," by Elaine V. Morley, all of the above disclosures of which are incorporated herein by reference in their entirety for all purposes.

TECHNICAL FIELD OF THE INVENTION

This invention relates to methods for data entry and verifying that data is correctly entered, and, in particular, to a method for assuring employer compliance with employee employment eligibility verification requirements.

BACKGROUND OF THE INVENTION

The U.S. Department of Justice, Immigration and Naturalization Service, administers federal statutory requirements and regulations which require that employers verify that any persons hired as employees or to perform services, that its workers are eligible to work in the United States. Presently, to assure that employers adequately verify eligibility to work in the United States, federal regulations require that employers complete a U.S. Department of Justice, Immigration and Naturalization Service, Form I-9 document. Completion of the Form I-9 requires that employers inspect various ones of specified documents, which requires that employers review originals of the documents and not reproductions of the documents, to determine the employee's eligibility to work in the United States. If an employer does not perform the procedure outlined in the Form I-9, and accurately complete the Form I-9, such employer is subject to civil penalties and persons completing such forms on behalf of the employer may also be subject to criminal penalties for not complying with the eligibility verification requirements under United States immigration law.

Accurately verifying employment eligibility and successfully completing the U.S. Department of Justice, Immigration and Naturalization Service's Form I-9 to verify employment eligibility requires that each employer train at least one person who develops the requisite expertise and familiarity with verification requirements to accurately complete such forms. Employers will also have to monitor previously completed Form I-9's to determine that new Form I-9's are completed prior to expiration the documents used to verify the employees' eligibility to work in the United States. Industry wide, across the United States, this creates a large financial burden for various companies to adequately assure that their personnel are appropriately trained to meet and maintain such compliance requirements, and often, once trained, such trained persons are subject to turnover. Additionally, as employment eligibility requirements change, such persons will have to keep current on any regulatory changes and implement any changes in regulatory requirements into the employment eligibility program of each particular employer in the United States.

SUMMARY OF THE INVENTION

A method is provided for assuring employer compliance with verifying employment eligibility in the United States, which aids employers in assuring compliance with federal regulations. An employer may utilize the method of the present invention by accessing a software program over a global computer network, through telecommunications systems, or by obtaining and loading the appropriate software in a local computer on his job site. Compliance alerts and compliance tips are displayed for guiding an employer in completing the Form I-9. The compliance tips may be selected and modified by a particular employer. After a Form I-9 is completed, the data in such forms may be automatically audited to analyze whether the completed Form I-9 has been accurately completed, and a listing provided of various errors and additional data required. During the audit, various compliance rules are applied to Form I-9 data entered into a data processing system to determine whether various Immigration and Naturalization Service regulations are met in completing an employment eligibility verification Form I-9. The method is administered by a singular service provider for multiple employers, to assure that applicable regulations are incorporated and updated regularly to assure industry-wide compliance. The process further provides a central system for managing the current Form I-9's for employers, including identifying documents which are soon to expire such that the employers can be notified to complete a new employment eligibility Form I-9 prior to the expiration of such documents, which assures continued compliance with federal regulations.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
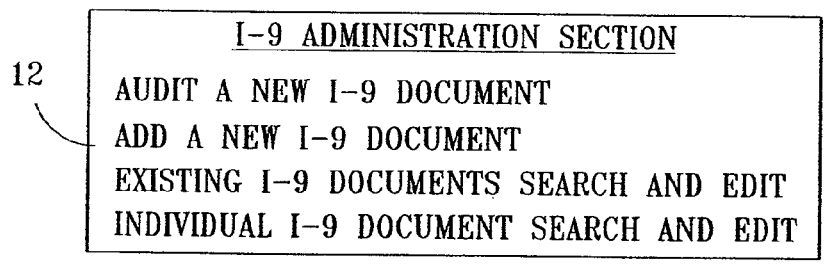
FIG. 1 is a view screen display of an I-9 Administration Section, showing various tasks for use in a process according to the present invention.

FIG. 1 is a view screen display of an I-9 Administration Section listing 12 for use in verifying employment eligibility of a potential employee according to the present invention. The I-9 Administration Section 12 lists several options for initiating various tasks. The first listed task is entitled "Audit A New I-9 Document." The Audit task allows a user to import data from an existing Form I-9 document, and then to perform a compliance rules analysis on the data of the existing Form I-9 document to determine whether the existing Form I-9 document was correctly completed. Such data for auditing may be imported from another type of database, manually entered into the system, or optically scanned from previously completed Form I-9 documents. The next listed task in the I-9 Administration Section 12 is entitled "Add A New I-9 Document." The Add task allows a user to initiate the pulling up of a blank Form I-9, in which data can be filled into the various fields. The I-9 Administration Section 12 further includes a task listing entitled "Existing I-9 Documents Search And Edit" task, by which all of the existing Form I-9 documents associated with a particular employer are listed for selection by a user for editing. The user may then look through the listing to select a particular Form I-9 document and select various Action Options, such as performing the compliance rules analysis in a recalculate analysis, printing, auditing, editing or deleting. The last listed task in the I-9 Administration Section 12 is the Individual I-9 Document Search and Edit. The Individual I-9 Document task allows a user to search for an existing Form I-9 document for a particular employee, by searching for such employee fields as first name, last name, date of birth, social security number, and other such employee identifying numbers.

Figure 2:
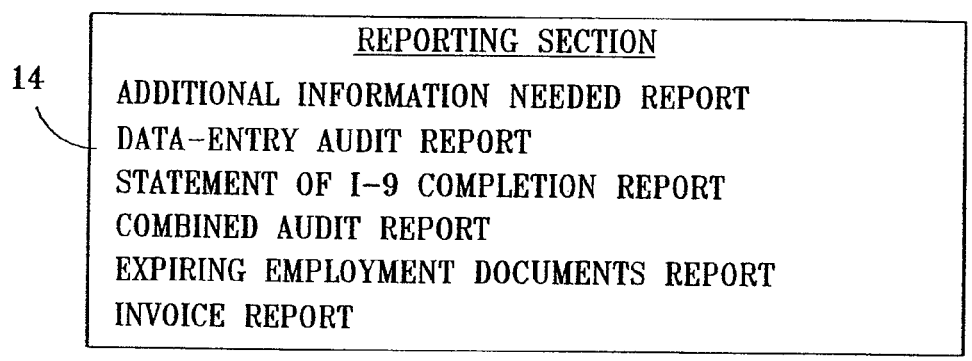
FIG. 2 is a view screen display of a Reporting Section, showing various report options which are available according to the process.

FIG. 2 is a view screen display of a Reporting Section 14, from which various reports may be selected for review by a user. The first listed report is an Additional Information Needed Report, which lists various data needed to complete the Form I-9's associated with a particular employer as identified by performing the compliance rules analysis on the Form I-9 documents associated with a particular employer. Preferably, the Additional Information Needed Report will not list incurable defects in the Form I-9's being analyzed, but will only this those defects in the documents which may be cured. Such curable defects will include various incompatible and missing data entries listed in Form I-9 documents associated with the particular employer. The Additional Information Needed Report may also identify both blank fields and inconsistent entries, such as the selection of incompatible document types or the entry of incompatible dates, which cannot be correct.

The next listing in the Reports Screen of FIG. 2 is Data Entry Audit Report, which provides a report of when various Form I-9's are completed for review by an employer. Typically, the employer will list a range of dates from which the report is created. The Data Entry Audit Report will then provide a listing of the Form I-9's which were completed during the selected range of dates, preferably providing the listing in tabular form and including the for each listed Form I-9 the employee's name, social security number, date of hire, work location, and the like. From this listing, employer's may determine if a sufficient number of Form I-9's have been completed to accommodate the amount of persons hired by the employer over selected range of dates.

The next listing in the Reporting Section 14 is a Statement of I-9 Completion Report. This report lists for the various Form I-9 documents associated with a particular employer both the documents which are completed, and the documents which are completed except for incurable defects. The Statement of I-9 Completion Report will not list those documents which have curable defects, which should be listed in the Additional Information Needed Report. Similarly, the Additional Information Needed Report will not list those documents which are listed in the Statement of I-9 Completion Report as being either fully complete Form I-9's, or fully complete Form I-9's except for incurable defects.

Presently, there are four incurable defects which, if corrected on a Form I-9, would constitute fraud and subject the responsible employer and any person making such changes on that employer's behalf to criminal liability. One of the four incurable defects is failure of an employer to require a newly hired employee to complete all or any portion of Section 1 of a Form I-9 no later than on the date on which that employee's employment services for that employer commence. A second one of the four incurable defects is failure of an employer to reverify Form I-9 Section 1 or Section 2 expiration date, if such date requires reverification, no later than the date on which the document to which such date relates expires. A third incurable defect is failure of an employer to complete Section 2 of the Form I-9 within three (3) days of the employee's employment start date, which could be significantly later than the date on which the employment was offered and accepted and which was the first opportunity under law to complete the Form I-9 without possible consequences for discriminatory treatment. A fourth incurable defect is failure of an employer, when rehiring a former employee, to update Section 3 of the Form I-9 that remains on file for that employee, subject to the retention requirement. Each of the above-noted four defects are incurable because they are date sensitive and it would be fraudulent for a person to place a different date on a Form I-9 than that on which the pertinent Form I-9 section has actually been completed.

The next report listed in the Reporting Section 14 is a Combined Audit Report, which is preferably a combination of the Additional Information Needed Report and the Statement of I-9 Completion Report. The Combined Audit Report lists all of the Form I-9's associated with a particular employer, which includes the Form I-9's which are fully complete, the Form I-9's which have curable defects and the Form I-9's which have incurable defects. The Combined Audit Report will also identify the employee of the listed Form I-9, and the particular defects associated with various ones of the listed Form I-9s.

The next report in Reporting Section 14 is an Expiring Employment Documents Report. This report identifies various documents which are expiring on particular dates which are associated with a particular employer. This report may be run according to a selected range of dates, such that an employer may begin processing the required updates for the pertinent Form I-9's prior to the actual dates of expiration of the documents. Should a document used in Section 2 of the Form I-9 expire prior to updating of the pertinent Form I-9, this would create an incurable defect for that particular Form I-9, subjecting the employer to potential liability.

The next report is an Invoice Report, which lists the various invoice balances a particular employer has on account with a particular compliance analysis service provider providing the services of to the present invention to that employer. The next report listed in the Reporting Section 14 is a Recalculate Statement of I-9 Completion Report, which will perform the compliance rules analysis by running checks for each Form I-9 associated with a particular employer to provide an error listing in a Statement of I-9 Completion Report for the various documents.

Figure 3:
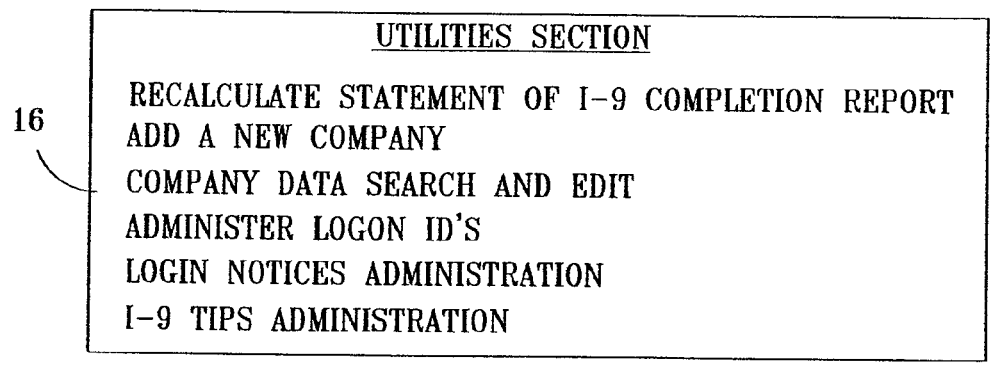
FIG. 3 is a view screen display of an Utilities Section, showing various administrative tasks for managing administration of and access to the process.

FIG. 3 is a view screen listing of a Utilities Section 16, listing various options for performing administrative tasks. The first menu listing is entitled "Add A New Company." The next listing is entitled "Company Data Search & Edit," in which data associated with a particular employer may be searched and edited. The next listing in the Utilities Section 16 is entitled "Administer Logon ID's." This task is used for changing various logon ID's and passwords for particular employees of an employer who are performing the administrative tasks for the present method. The next listed task is entitled "Login Notices Administration," which allows the service provider to post various notices regarding processing of the Form I-9's, such as changes in immigration regulations which are not yet incorporated into the rules used for compliance analysis. The Login Notices may also post for viewing special notices issued by the Immigration and Naturalization Services affecting a particular group of foreign nationals, and the like. Preferably, such Login Notices will be provided by a pop-up window which appears when a user logs into the system. The next listing is entitled "I-9 TIPS Administration," which allows a particular employer to modify the TIPS for display to their associated users who are entering data into a Form I-9.

Figure 4:
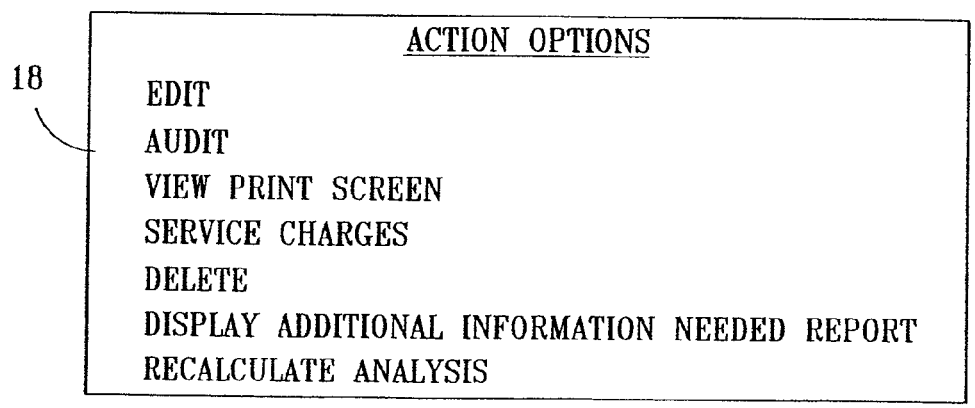
FIG. 4 is a view screen display of Action Options which may be performed in working with a particular Form I-9 document, or a group of documents.

FIG. 4 is a view screen listing of Action Options 18, which are various actions which may be taken when reviewing a particular Form I-9 document. The first is listed action is entitled "Edit," and allows a user to go back into the selected document to edit the document. Preferably, the document is displayed and the user is allowed access to the various individual fields by selecting a particular field viewed on the screen with a graphical user interface. The next action listed in the Action Options Menu 18 is entitled, "Audit." The Audit feature displays the compliance rules analysis report for a particular selected Form I-9 document, without displaying any alerts or TIPS. The Audit feature may be used to generate a Statement of I-9 Completion Report for particular documents, or for a group of documents of an associated employer. The next action option is entitled "View Print Screen," and primarily displays the Form I-9 documents in a fixed graphical format, as it will be printed if printing is selected when the View Print Screen option is displayed. The next listed option in the Action Options Menu 18 is entitled "Service Charges," and provides a display of the various service charges due by the employer affiliated with the user I.D. currently accessing the system. The next option is entitled "Delete," and may be used to delete the field data of a particular Form I-9 document. The next option in the Action Options Menu 18 is entitled "Display Additional Information Needed Report," which provides a display listing of additional data required to complete the selected documents associated with the particular employer. The next option in the Action Options Menu 18 is entitled "Recalculate Analysis," and recalculates the audit report of the compliance analysis for a group of particular selected documents. This option, as opposed to the audit option, would recalculate the analysis from a group of selected documents by running checks in I-9's. The audit feature will only recalculate the checks analysis for a particular document.

Figure 5A:
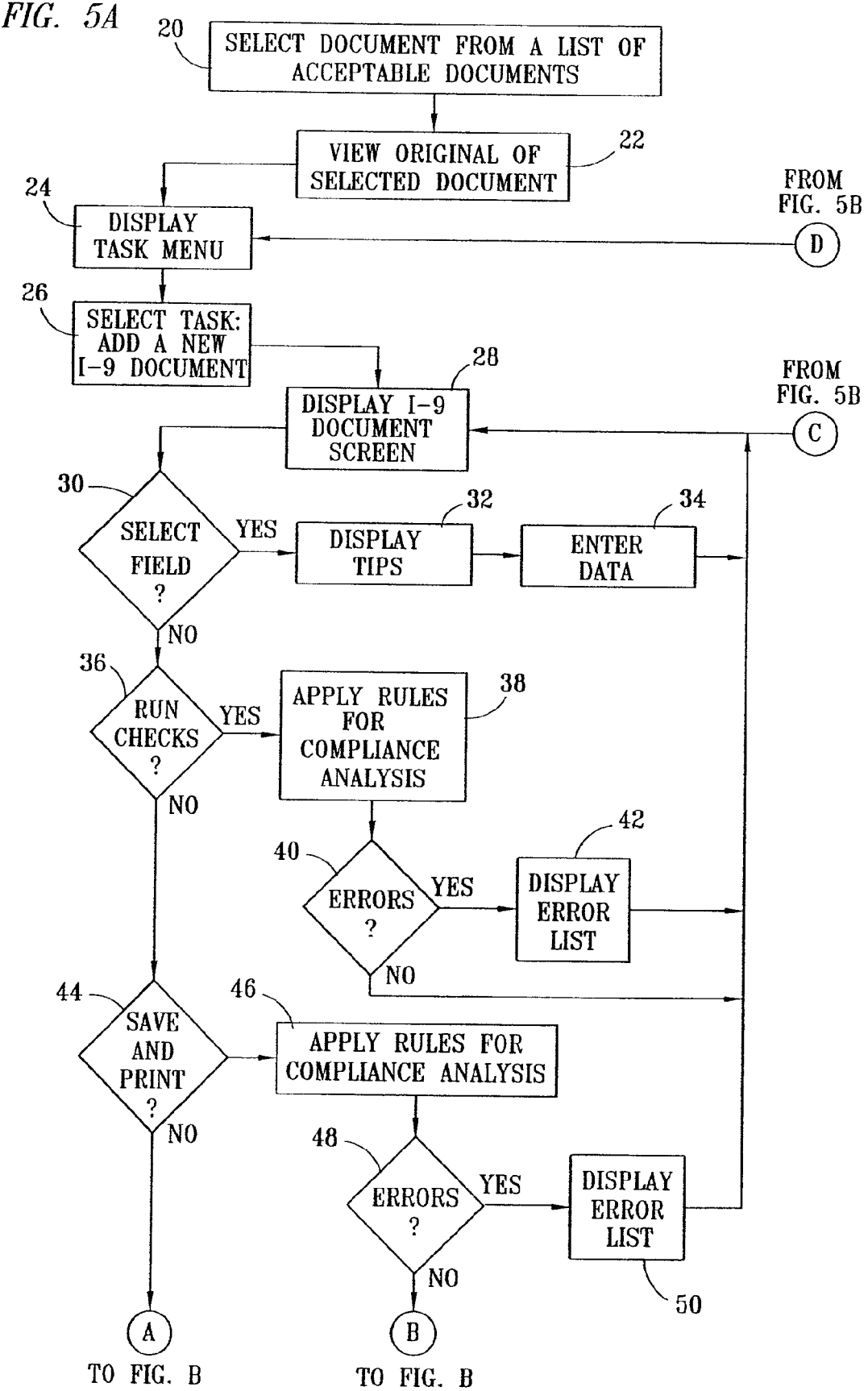
FIGS. 5A and 5B together provide a flow chart showing operation of the process.
Figure 5B:
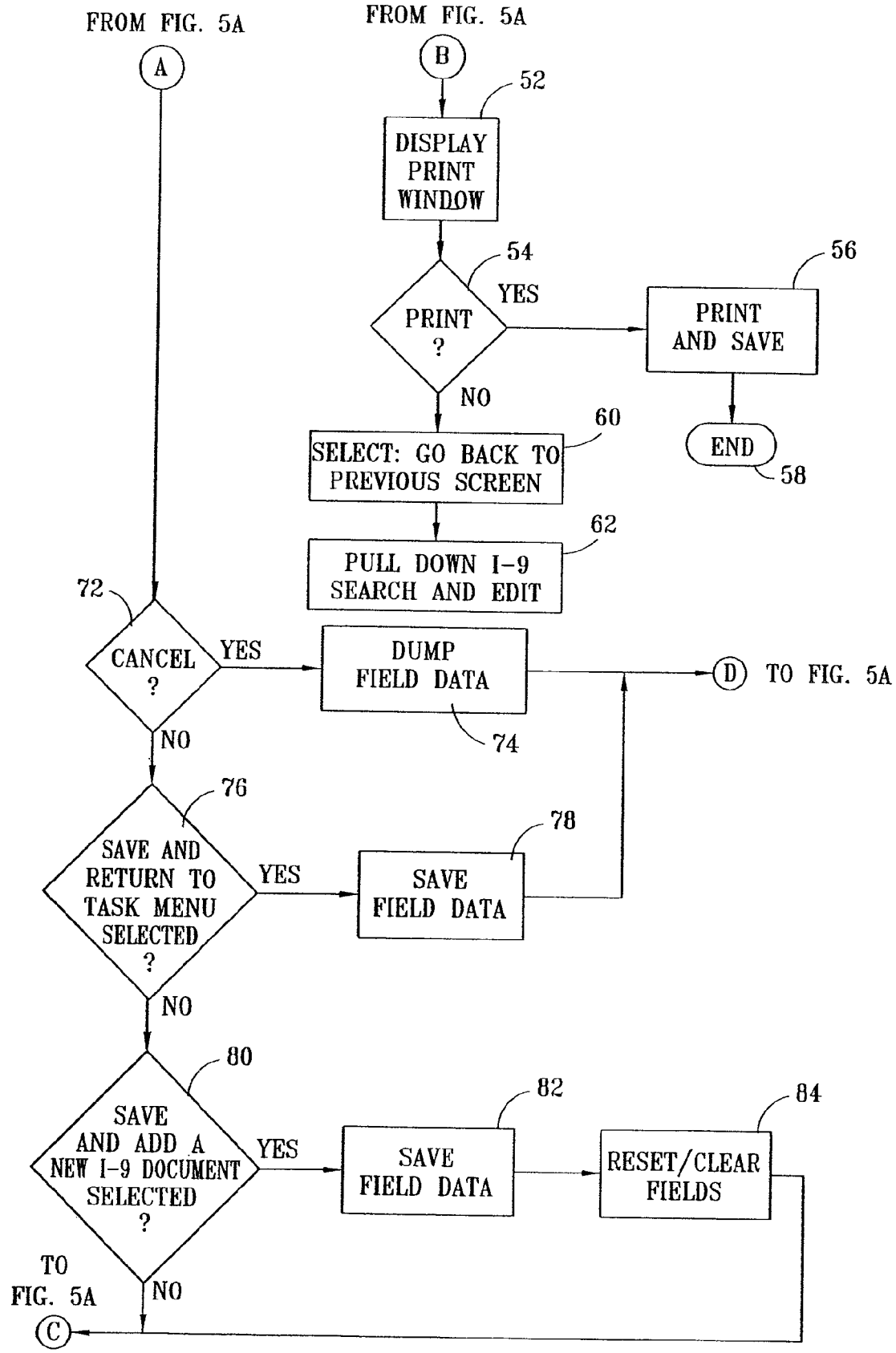

FIG. 5A and FIG. 5B together provide a flow chart showing a method for verifying employment eligibility of employees according to the present invention. The flowchart begins at block 20, after the employee has completed and signed Section 1 of a Form I-9 and the employer is beginning to complete Section 2 of the Form I-9. The first step in the process is the step of selecting documents from a list of acceptable documents, shown in block 20. After selection of acceptable documents, the employer must personally review originals of the acceptable documents, and not copies, in the step shown in block 22. In block 24, a display Task Menu Screen step is depicted, in which preferably a combined menu listing of the I-9 Administration Section 12 of FIG. 1, the Reporting Section 14 of FIG. 2, and the Utilities Section 16 of FIG. 3 are displayed on a single view screen. The next step is to select a task, with the selected task being shown in FIG. 5A as Add A New I-9 Document, which is depicted in block 26. In block 28, the Form I-9 document is displayed on a view screen. If Add A New I-9 Document is selected in I-9 Administration Section 12, the display I-9 document step of block 28 will display an Form I-9 document with all the fields blank, that is, a blank document will be displayed. If Edit An Existing Document is selected, the display I-9 document screen in block 28 will display an existing document, with data for the various fields displayed in the Form I-9 document. Next, a user will select a data entry field and the computer will determine whether the field has been selected in decision block 30. When a field is selected in block 32, the display TIPS step is performed. If there are any TIPS for display with the associated field, such TIPS will be displayed on the view screen in a pop-up window. In block 34, the data will be entered by the user and stored in a database for the Form I-9, and then the new entered data is displayed in the Form I-9 document screen 28. The process returns to the select field decision block 30, and if a new field is selected, the display TIPS step 32 and enter data step 34 are performed. The process will return to the display Form I-9 document screen shown in block 28 and wait until a new field is selected for data entry. New fields may be selected by hitting the Enter key without changing the data listings in a particular field.

Next, the process will proceed to the step depicted in block 36 if a new field is not selected. Block 36 is a run checks decision block which determines whether run checks has been selected by requesting an audit or perform compliance analysis task. From the run checks decision block 36, the process proceeds to block 38 to apply various Form I-9 document rules will be applied to the various data fields to perform the compliance rules analysis. The rules for compliance analysis are set forth in Table III. If any errors are detected in the decision block 40 after the compliance analysis is complete for the particular Form I-9, an error list of various errors compiled will be displayed in block 42. If not, the process will return back to the display Form I-9 screen of block 28. If errors are displayed in block 42, they will preferably be displayed in a pop-up window which is overlaid with the display Form I-9 document screen of block 28.

If the option of save and print a particular Form I-9 is selected, as determined in decision block 44, the process proceeds to perform for the compliance analysis step depicted in block 46. The compliance analysis step of block 46 is the same as the compliance analysis step depicted in block 38, and is performed as a final check prior to printing. If errors are detected as shown in block 48, then the a display error list report 50 will be performed and the listing of errors will be displayed in a window which pops up to overlay the display I-9 document screen of block 28. At this point, an option is provided to cancel printing and stay in the display I-9 screen so that the user may correct the errors, and an option is also provided to disregard the errors and proceed to the display print window step of block 52 to print the Form I-9. If no errors are detected in decision block 48, the process will proceed to the display print window step depicted in block 52. Reminder messages preferably appear, such as a reminder that the user should review an employee's original documents in completing the Form I-9. Then, a user may select to print the Form I-9 document in block 54, and the process will proceed to the step of block 56 in which the Form I-9 document will be printed and saved. The print process ends as depicted in block 58, and the process returns to the display I-9 Administration Section of block 24. If print is not selected in decision block 54, then a user may select to go back to the previous screens, as depicted in block 60. As depicted in block 62, a user may selected go back to previous display screens to return to pull down an I-9 search and edit a document, by proceeding back to the step of the Display I-9 Administration Section depicted in block 24.

If an Form I-9 document is being displayed on a view screen in the step depicted in the block 28, and cancel is selected, then the process will determine that cancel has been selected as shown by the step depicted in the decision block 72. The field data will be cleared from the various fields of the Form I-9 document as shown in the step depicted in block 74, and the process will return to the task menu as depicted in the block 24. If the save and return to the task menu is selected while the process is displaying a Form I-9 document on the view screen in the step depicted in block 28, this will be detected in the step depicted in the decision block 76. The field data is saved in the step depicted in block 78, and the process will proceed to the display task menu step of block 24. If, when the Form I-9 document is displayed on the screen in the step depicted in block 28, the save and add a new Form I-9 document is selected, field data for the particular document being displayed at the time of selection will be saved in the step depicted in block 82. The fields will be reset and cleared in step depicted in block 84, and the process will proceed to the step depicted in block 28, in which a blank Form I-9 document will be displayed on the view screen.

Figure 6:
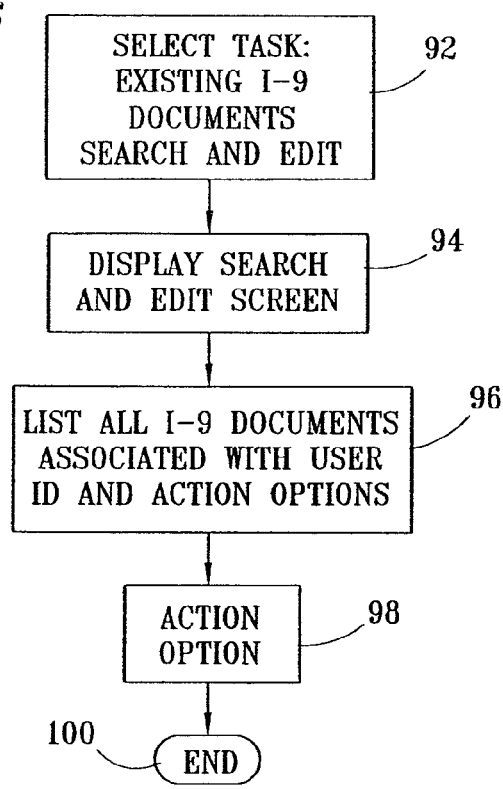
FIG. 6 is a block diagram showing a process for searching for an existing Form I-9 document among various documents affiliated with a particular employer.

FIG. 6 is a block diagram showing the process for searching for existing Form I-9 documents affiliated with a particular employer. From the display task menu step of block 24, if the Existing I-9 Documents Search and Edit task is selected from the I-9 Administration Section of FIG. 1, the process will proceed to the select task step depicted the block 92. In the step depicted in block 94, the various Form I-9 documents will be displayed in the search and edit screen. This is a tabular listing of each of the various ones listing identifying indicia, such as the employee name and other such information. In the step depicted in block 96, all the Form I-9 documents associated with the user I.D. and action options will be listed. The various action options available are preferably those listed in the Action Options menu 18 of FIG. 4. In the step depicted in block 98, a particular action option is selected and performed by going to the respective steps selected in the process of the block diagram shown in FIGS. 5A and 5B. Then, the process will end in the step 100 and return to the step of displaying the I-9 Administration Section 22 of FIG. 1.

Figure 7:
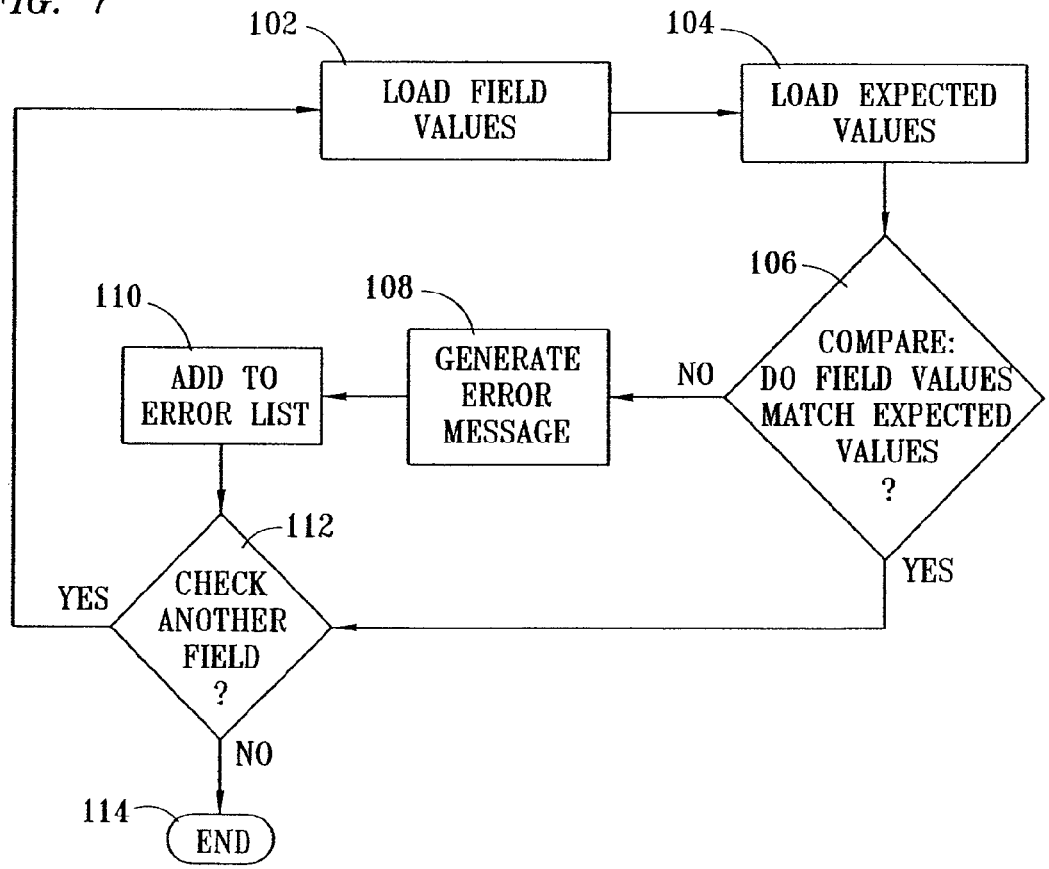
FIG. 7 is a flow chart showing a process for performing a compliance analysis, to determine whether an employment eligibility verification form has been accurately completed.

FIG. 7 depicts a process flow for performing the compliance analysis, that is the run checks step for the blocks 38 and the block 46 of FIG. 5A. Once the run checks feature is selected to determine the compliance analysis report, the process proceeds to the block 102, which depicts the step of loading field values into memory. Then, expected values are loaded into memory in the step depicted in the block 104. In the block 106, the expected values loaded into block 104 and the field values loaded into block 102, for a particular field, are compared to determine whether an error has occurred. If an error has occurred, the expected field values will not match or equal the loaded field values, and a generate error step will be performed as depicted in the block 108, The error listing will be added to an error list in the block 110. Then, the process will return to the step in decision block 112 to determine whether to repeat the process depicted in the blocks 102, 104, 106. If another field is not to be checked, then it will proceed to end step depicted in block 114, and the process will then return back to the display screen shown in step 24 of FIG. 5A.

Figure 8:
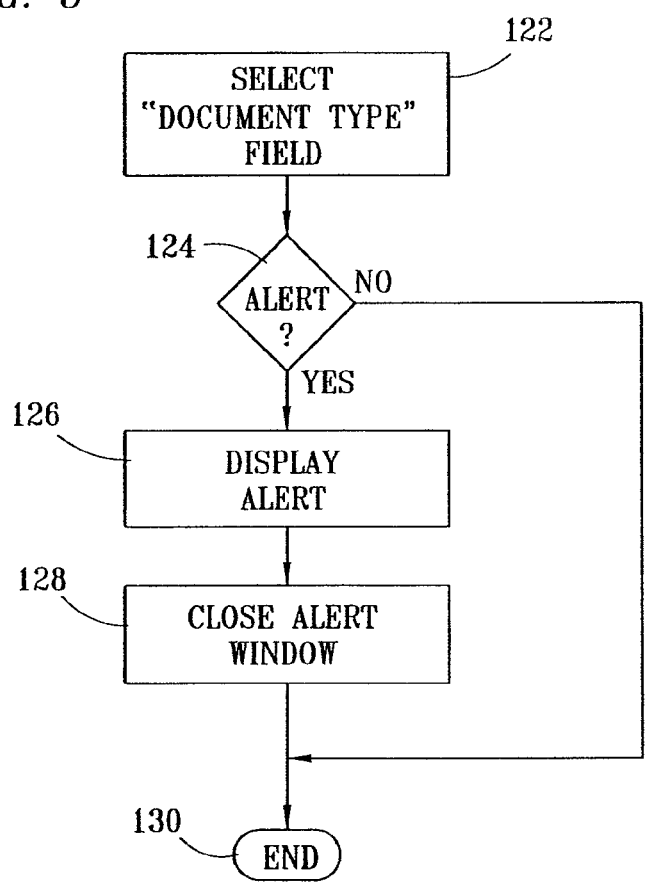
FIG. 8 is a flow chart showing various process steps for displaying alerts when document types are selected as verification documents for use in a particular I-9 document.

FIG. 8 is a block diagram depicting the various process steps for displaying alerts when particular document types are selected in the verification documents fields of a particular Form I-9 document. When a select document type filed is selected as depicted in block 122, a process will proceed to decision block 124 to determine if there is an alert for the particular document type selected in the pull down menu. If there is no alert, the process will proceed to the end step shown in block 130, returning back to the display I-9 document screen, depicted in the block 28 in FIG. 5A. If there is an alert, the process will proceed to the step of displaying the alert, as depicted in the block 126. The alert is preferably displayed as a pop-up window which overlays the I-9 document screen. Once the alert has been viewed, the user may close the alert window, as depicted in block 128. Then, the display alert process will end, as depicted in the block 130, and the process will proceed back to the display I-9 screen, as depicted in block 28 of FIG. 5A.

The method of determining employer compliance with verification of employment eligibility of the present invention is performed, at least in part, in a data processing system. The processing may be performed across a distributed network, such in a global computer network, or across telecommunication systems, with processing of various steps according to the method occurring for a particular document at remote locations. For example, an employer could access a remote server through a global computer network or through a telecommunications system, log into the server and remotely process the employment verification of an employee at the remote server. Similarly, the employer may use a local data processing system to locally process the information to verify the identity and employment eligibility of the employee. Employer and employee signatures may also be applied to an electronic document via an electronic or digital signatures, according to the present invention. Various steps according to the method may also be processed in part manually by the employer verifying employment, and then the resulting data may be optically scanned into or manually entered from a paper for I-9 for electronic storage, such that a data processing system can perform the checks step of FIG. 7 to determine employer compliance with various Immigration and Naturalization Service regulations.

The process also preferably uses the Social Security Administration's Enumeration Verification Service ("EVS") to verify the validity of a social security number presented by an employee for employment, and such other employee data which may be provided by the employee. Other such employee date provided by and employee and entered into a data processing system according to the present invention may be compared to data listed for the employee on a remote server to audit the accuracy of the employee supplied data, such as with government databases, in addition to the Social Security Administration's EVS, credit bureaus, licensing and association databases, general databases, and the like. Historical databases may also be used to audit old work address, business address, and such other employee provided information.

Tables are listed in the following to provide various examples of forms, rules and the like used with the present invention. Table I lists one page of a Form I-9. Table II lists acceptable documents for use for identification purposes with the Form I-9. Table III lists the verification rules. Table IV lists Alerts. Table IV lists the TIPs.

Although the preferred embodiment has been described in detail, it should be understood that various changes, substitutions and alterations can be made therein without departing from the spirit and scope of the invention as defined by the appended claims.

TABLE I: FORM I-9

U.S. Department of Justice
Immigration and Naturalization Service

OMB No. 1115-0136
Employment Eligibility Verification

Please read instructions carefully before completing this form. The instructions must be available during completion of this form. ANTI-DISCRIMINATION NOTICE: It is illegal to discriminate against work eligible individuals. Employers CANNOT specify which document(s) they will accept from an employee. The refusal to hire an individual because of a future expiration date may also constitute illegal discrimination.

Section 1. Employee Information and Verification. To be completed and signed by employee at the time employment begins.

| Print Name: Last | First | Middle Initial | Maiden Name |
|---|---|---|---|
| Address (Street Name and Number) | | Apt. # | Date of Birth (month/day/year) |
| City | State | Zip Code | Social Security # |

| I am aware that federal law provides for imprisonment and/or fines for false statements or use of false documents in connection with the completion of this form. | I attest, under penalty of perjury, that I am (check one of the following): <br> ☐ A citizen or national of the United States <br> ☐ A Lawful Permanent Resident (Alien # A_____) <br> ☐ An alien authorized to work until ___/___/___ <br> (Alien # or Admission #) _____ |
|---|---|
| Employee's Signature | Date (month/day/year) |

Preparer and/or Translator Certification. *(To be completed and signed if Section 1 is prepared by a person other than the employee.) I attest, under penalty of perjury, that I have assisted in the completion of this form and that to the best of my knowledge the information is true and correct.*

| Preparer's/Translator's Signature | Print Name |
|---|---|
| Address (Street Name and Number, City, State, Zip Code) | Date (month/day/year) |

Section 2. Employer Review and Verification. To be completed and signed by employer. Examine one document from List A OR examine one document from List B and one from List C, as listed on the reverse of this form, and record the title, number and expiration date, if any, of the document(s)

| List A | OR | List B | AND | List C |
|---|---|---|---|---|
| Document title: _____ | | _____ | | _____ |
| Issuing authority: _____ | | _____ | | _____ |
| Document #: _____ | | _____ | | _____ |
| Expiration Date (if any): ___/___/___ | | ___/___/___ | | ___/___/___ |
| Document #: _____ | | | | |
| Expiration Date (if any): ___/___/___ | | | | |

CERTIFICATION - I attest, under penalty of perjury, that I have examined the document(s) presented by the above-named employee, that the above-listed document(s) appear to be genuine and to relate to the employee named, that the employee began employment on (month/day/year) ___/___/___ and that to the best of my knowledge the employee is eligible to work in the United States. (State employment agencies may omit the date the employee began employment.)

| Signature of Employer or Authorized Representative | Print Name | Title |
|---|---|---|
| Business or Organization Name | Address (Street Name and Number, City, State, Zip Code) | Date (month/day/year) |

Section 3. Updating and Reverification. To be completed and signed by employer.

| A. New Name (if applicable) | B. Date of rehire (month/day/year) (if applicable) |
|---|---|

C. If employee's previous grant of work authorization has expired, provide the information below for the document that establishes current employment eligibility.

Document Title: _____ Document #: _____ Expiration Date (if any): ___/___/___

I attest, under penalty of perjury, that to the best of my knowledge, this employee is eligible to work in the United States, and if the employee presented document(s), the document(s) I have examined appear to be genuine and to relate to the individual.

| Signature of Employer or Authorized Representative | Date (month/day/year) |
|---|---|

Form I-9 (Rev. 11-21-91)N Page 2

TABLE II: LISTING OF ACCEPTABLE DOCUMENTS

LISTS OF ACCEPTABLE DOCUMENTS

| LIST A | | LIST B | | LIST C |
|---|---|---|---|---|
| Documents that Establish Both Identity and Employment Eligibility | OR | Documents that Establish Identity | AND | Documents that Establish Employment Eligibility |
| 1. U.S. Passport (unexpired or expired) | | 1. Driver's license or ID card issued by a state or outlying possession of the United States provided it contains a photograph or information such as name, date of birth, sex, height, eye color and address | | 1. U.S. social security card issued by the Social Security Administration *(other than a card stating it is not valid for employment)* |
| 2. Certificate of U.S. Citizenship *(INS Form N-560 or N-561)* | | | | |
| 3. Certificate of Naturalization *(INS Form N-550 or N-570)* | | 2. ID card issued by federal, state or local government agencies or entities, provided it contains a photograph or information such as name, date of birth, sex, height, eye color and address | | 2. Certification of Birth Abroad issued by the Department of State *(Form FS-545 or Form DS-1350)* |
| 4. Unexpired foreign passport, with *I-551 stamp or* attached INS Form I-94 indicating unexpired employment authorization | | | | 3. Original or certified copy of a birth certificate issued by a state, county, municipal authority or outlying possession of the United States bearing an official seal |
| 5. Alien Registration Receipt Card with photograph *(INS Form I-151 or I-551)* | | 3. School ID card with a photograph | | |
| | | 4. Voter's registration card | | |
| | | 5. U.S. Military card or draft record | | |
| 6. Unexpired Temporary Card *(INS Form I-688)* | | 6. Military dependent's ID card | | 4. Native American tribal document |
| 7. Unexpired Employment Authorization Card *(INS Form I-688A)* | | 7. U.S. Coast-Guard Merchant Mariner Card | | 5. U.S. Citizen ID Card *(INS Form I-197)* |
| | | 8. Native American tribal document | | |
| 8. Unexpired Reentry Permit *(INS Form I-327)* | | 9. Driver's license issued by a Canadian government authority | | 6. ID Card for use of Resident Citizen in the United States *(INS Form I-179)* |
| 9. Unexpired Refugee Travel Document *(INS Form I-571)* | | For persons under age 18 who are unable to present a document listed above: | | 7. Unexpired employment authorization document issued by the INS *(other then those listed under List A)* |
| 10. Unexpired Employment Authorization Document issued by the INS which contains a photograph *(INS Form I-688B)* | | 10. School record or report card | | |
| | | 11. Clinic, doctor or hospital record | | |
| | | 12. Day-care or nursery school record | | |

Illustrations of many of these documents appear in Part 8 of the Handbook for Employers (M-274)

TABLE III: RULES FOR COMPLIANCE ANALYSIS

| | I-9 Verification | | ?? |
|---|---|---|---|
| | Field | Condition | Message (DE = Data Entry, AI = Additional Information, SC = Statement of Completion) |
| 1 | Last Name | is blank | DE - Section 1, Last Name -- Last name field is blank<br>AI - Employee Last Name is missing |
| 2 | First Name | is blank | DE - Section 1, First Name -- First name field is blank<br>AI - Employee First Name is missing |
| 3 | Middle Initial | no verification | |
| 4 | Maiden Name | no verification | |
| 5 | Address | is blank | DE - Section 1, Address -- Address field is blank<br>AI - Address Line is missing |
| 6 | Apt. # | no verification | |
| 7 | City | is blank | DE - Section 1, City -- City field is blank<br>AI - City is missing |
| 8 | State | is blank | DE - Section 1, State -- State field is blank<br>AI - State is missing |
| 9 | Zip | is blank | DE - Section 1, Zip Code -- Zip code field is blank<br>AI - Zip Code is missing |
| 10 | Date of Birth | is blank or invalid | DE - Section 1, Date of Birth -- Date of Birth is Invalid<br>AI - Date of Birth is missing |
| 11 | Attestation | is blank | DE - Section 1, Status Category -- Employer must ensure that employee completes Section 1. Do not continue to Section 2 until employee completes Section1. Otherwise, the INS may infer that a violation has occurred.<br>AI - Status Category is missing |

TABLE III: RULES FOR COMPLIANCE ANALYSIS

| | Field | Condition | Message (DE = Data Entry, AI = Additional Information, SC = Statement of Completion) |
|---|---|---|---|
| 12 | Attestation | two or more are chosen | DE - Section 1, Status Category -- Only one Status category is allowed<br>AI - Only one Status category is allowed |
| 13 | Work Expiration Date | is blank or invalid AND "Authorized Alien" checked | DE - Section 1, Authorized To Work Until -- Authorized to work status must include a valid work expiration date<br>AI - Work Expiration Date is missing |
| 14 | Work Expiration Date | is not blank | Tracking--will show up on Expiring Employment Documents Report 120 days prior to expiration |
| 15 | Alien/Admission # | length is not 8 or 9 or 10 or 11 AND "Authorized Alien" checked | DE - Section 1, Alien/Admission Number -- Alien Number must be 8 or 9 digits<br>AI - Alien Number must be 8 or 9 digits |
| 16 | Alien #A | length is not 8 or 9 AND "Permanent Resident" checked | DE - Section 1, Alien Number -- Permanent Alien Number must be 8 or 9 digits<br>AI - Permanent Alien Number must be 8 or 9 digits |
| 17 | Employee's Signature | is not present | DE - Section 1, Employee Signature -- Employee signature is missing<br>AI - Employee signature is missing |
| 18 | Employee Signature Date | is blank or invalid | DE - Section 1, Employee Signature Date -- Employee signature date is missing<br>AI - Employee Signature Date missing |
| 19 | Employee Signature Date vs Work Expiration Date | is greater than Work Expiration Date | DE - Section 1, Authorized To Work Until -- Work Expiration Date must not be expired at the time employee signs Section 1<br>AI - Work Expiration Date was expired at the time employee signed Section 1 |

TABLE III: RULES FOR COMPLIANCE ANALYSIS

| | Field | Condition | Message (DE = Data Entry, AI = Additional Information, SC = Statement of Completion) |
|---|---|---|---|
| 20 | Preparer's Signature | no verification | |
| 21 | Preparer's Name | no verification | |
| 22 | Preparer's Address | no verification | |
| 23 | Preparer's Signature Date | no verification | |
| 24 | List A Title | is blank | DE - Section 2, List A Document Title -- List A Document Title needs to be completed<br>AI - List A Title is missing |
| 25 | List A Title | is "Other" | DE - Section 2, List A Document Title -- List A Document Title is invalid<br>AI - List A Title is invalid |
| 26 | List A Title VS. Section 1 Attestation | is NOT choice 1,2, or 3 and is "Citizen" | DE - Section 2, List A Document Title -- List A Document Title given conflicts with citizenship status chosen in Section 1.<br>AI - Status of employee indicated in section 1 conflicts with documents presented in section 2. In Section 1 the employee has indi |
| 27 | List A Title VS. Section 1 Attestation | is NOT choice 5 and is "Permanent Resident" | DE - Section 2, List A Document Title -- List A Document Title given conflicts with permanent resident status chosen in Section 1.<br>AI - Status of employee indicated in section 1 conflicts with documents presented in section 2. In Section 1 the employee h |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 28 | List A Title VS. Section 1 Attestation | is choice 1,2, 3, or 5 and is "Authorized Alien" | DE - Section 2, List A Document Title -- List A Document Title given conflicts with alien authorization status chosen in Section 1. AI - Status of employee indicated in section 1 conflicts with documents presented in section 2. In Section 1 the employee |
| 29 | List A Authority | is blank | DE - Section 2, List A Issuing Authority -- List A Issuing Authority needs to be completed AI - List A Issuing Authority is missing |
| 30 | List A first Document # | is blank | DE - Section 2, List A First Document Number -- List A first Document Number needs to be completed AI - List A First Document Number is missing |
| 31 | List A first Expiration Date VS. List A Title | is blank AND NOT choices 1,2, 3, or 5 | DE - Section 2, List A First Document Expiration Date -- List A first Document Expiration Date needs to be completed AI - List A First Document (...title...) Expiration Date is missing |
| 32 | List A first Expiration Date VS. List A Title VS. Override Expiration | is blank AND is choice 5 AND NOT overridden | DE - Section 2, List A First Document Expiration Date -- List A first Document Expiration Date needs to be completed AI - List A First Document (...title...) Expiration Date is missing |
| 33 | List A first Expiration Date | is not blank AND NOT choices 1,2,3, or 5 | Tracking--will show up on Expiring Employment Documents Report 120 days prior to expiration |

TABLE III: RULES FOR COMPLIANCE ANALYSIS

| | Field | Condition | Message (DE = Data Entry, AI = Additional Information, SC = Statement of Completion) |
|---|---|---|---|
| 34 | List A Title VS. List A first Document # | is choice 5 AND length is 10 or (starts with "A" and length is 9) or (starts without "A" and length is 8) | DE - Section 2, List A First Document Number -- Alien Registration Number must be 8 or 9 digits and start with an 'A' AI - List A First Document Number must be 8 or 9 digits for an Alien Registration Card |
| 35 | List A Title VS. List A second Document # | is choice 4 AND is blank | DE - Section 2, List A Second Document Number -- List A second Document Number is required for a Foreign Passport AI - List A second Document Number is required for a Foreign Passport |
| 36 | List A second Expiration Date VS. List A Title | is not blank AND NOT choices 1,2,3, or 5 | Tracking--will show up on Expiring Employment Documents Report 120 days prior to expiration |
| 37 | List A Title VS. List A second Expiration Date | is choice 4 AND is blank or invalid or N/A | DE - Section 2, List A Second Document Expiration Date -- List A second Document Number Date is required for a Foreign Passport AI - List A second Document Number Date is required for a Foreign Passport |
| 38 | List A Title VS. List A second Expiration Date | is choice 4 AND is prior to current date | DE - Section 2, List A Second Document Expiration Date -- List A second Document Number has expired AI - List A Second Document Number (...title...) has expired (...date...). Either update in Section 3 or complete a new I-9. |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 39 | List A first Expiration Date VS. List A Title VS. First Reverification Document Title | is prior to current date AND is NOT choices 1,2, 3, or 5 AND is NOT updated | DE - Section 2, List A First Document Expiration Date -- List A first Document Number has expired AI - List A First Document Number (...title...) has expired (...date...). Either update in Section 3 or complete a new I-9. |
| 40 | List A VS. List B VS. List C | List A all blanks OR (List B all blanks AND List C all blanks) | DE - Section 2, List A, B, and C -- No employment verification information was provided. Either List A or BOTH List B and List C must be completed  AI - No employment verification information was provided. Need either List A or BOTH List B and List C |
| 41 | List A VS. List B VS. List C | List A NOT all blanks AND (List B NOT all blanks OR List C NOT all blanks) | DE - Section 2, List A, B, and C -- Too much employment verification information was provided. Either List A or BOTH List B and List C must be completed  AI - Too much employment verification information was provided. Need either List A or BOTH List B and |
| 42 | List B Title | is blank | DE - Section 2, List B Document Title -- List B Document Title not completed properly  AI - List B Document Title is missing |
| 43 | List B Title | is "Other" | DE - Section 2, List B Document Title -- List B Document Title is invalid  AI - List B Document Title is invalid |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 44 | List B Title VS. Section 1 Attestation | is choice 4, 5, 7, or 8 and is "Permanent Resident" | DE - Section 2, List A Document Title -- List A Document Title given conflicts with permanent resident status chosen in Section 1.<br>AI - Status of employee indicated in section 1 conflicts with documents presented in section 2. In Section 1 the employee h |
| 45 | List B Title VS. Section 1 Attestation | is choice 4, 5, 7, or 8 and is "Authorized Alien" | DE - Section 2, List A Document Title -- List A Document Title given conflicts with alien authorization status chosen in Section 1.<br>AI - Status of employee indicated in section 1 conflicts with documents presented in section 2. In Section 1 the employee |
| 46 | List B Authority | is blank | DE - Section 2, List B Issuing Authority -- List B Issuing Authority not completed properly<br>AI - List B Issuing Authority is missing |
| 47 | List B Document Number | is blank | DE - Section 2, List B Document Number -- List B Document Number not completed properly<br>AI - List B Document Number is missing |
| 48 | List C Title | is blank | DE - Section 2, List C Document Title -- List C Document Title not completed properly<br>AI - List C Document Title is missing |
| 49 | List C Title | is "Other" | DE - Section 2, List C Document Title -- List C Document Title is invalid<br>AI - List C Document Title is invalid |

TABLE III: RULES FOR COMPLIANCE ANALYSIS

| | Field | Condition | Message (DE = Data Entry, AI = Additional Information, SC = Statement of Completion) |
|---|---|---|---|
| 50 | List C Title | is "US Social Security Card" | DE - Section 2, List C Document Title -- Employer is responsible for verifying that Social Security cards used for employment verification are not marked "not valid for employment" or "authorized for employment only with INS authorization". AI - (Standard |
| 51 | List C Title VS. Section 1 Attestation | is choice 7 and is "Citizen" | DE - Section 2 List C Document Title -- List C Document Title given conflicts with citizenship status chosen in Section 1. AI - Status of employee indicated in section 1 conflicts with documents presented in section 2. In Section 1 the employee has indic |
| 52 | List C Title VS. Section 1 Attestation | is NOT choice 1 or 7 and is "Permanent Resident" | DE - Section 2, List C Document Title -- List C Document Title given conflicts with permanent resident status chosen in Section 1. AI - Status of employee indicated in section 1 conflicts with documents presented in section 2. In Section 1 the employee h |
| 53 | List C Title VS. Section 1 Attestation | is NOT choice 1 or 7 and is "Authorized Alien" | DE - Section 2, List C Document Title -- List C Document Title given conflicts with alien authorization status chosen in Section 1. AI - Status of employee indicated in section 1 conflicts with documents presented in section 2. In Section 1 the employee |

TABLE III: RULES FOR COMPLIANCE ANALYSIS

| | Field | Condition | Message (DE = Data Entry, AI = Additional Information, SC = Statement of Completion) |
|---|---|---|---|
| 54 | List C Authority | is blank | DE - Section 2, List C Issuing Authority -- List C Issuing Authority not completed properly<br>AI - List C Document Issuing Authority is missing |
| 55 | List C Document Number | is blank | DE - Section 2, List C Document Number -- List C Document Number not completed properly<br>AI - List C Document Number is missing |
| 56 | List C Expiration Date VS. List C Title | is not blank AND is choice 7 | Tracking--will show up on Expiring Employment Documents Report 120 days prior to expiration |
| 57 | List C Expiration Date VS. List C Title | is blank or invalid AND is choice 7 | DE - Section 2, List C Expiration Date -- List C Expiration Date not completed properly AI - List C Document (...title...) Expiration Date is missing |
| 58 | List C Expiration Date VS. List C Title | is prior to current date AND is choice 7 | DE - Section 2, List C Expiration Date -- List C Document has expired AI - List C Document (...title...) has expired (...date...). Either update in Section 3 or complete a new I-9. |
| 59 | Employment Date | is blank | DE - Section 2, Hire Date -- Employee start date is missing<br>AI - Employee start date is missing |
| 60 | Completion Date VS. List A Title | is after 9/30/97 AND choice 2,3,8, or 9 | DE - Section 2, List A Document Title -- List A document type no longer acceptable after a completion date of 09/30/97 AI -<br>List A Document (...title...) no longer acceptable after a Completion Date of 09/30/97. Either update in Section 3 or complete a new I-9 |

TABLE III: RULES FOR COMPLIANCE ANALYSIS

| | Field | Condition | Message (DE = Data Entry, AI = Additional Information, SC = Statement of Completion) |
|---|---|---|---|
| 61 | List A first Expiration Date VS. Completion Date VS. List A Title | is prior to Completion Date AND NOT choices 1, 2, 3, or 5 | DE - Section 2, List A First Document Expiration Date -- List A first document expired before document completion date AI - List A First Document (...title...) expired (...date...) before Completion Date. |
| 62 | List A second Expiration Date VS. Completion Date VS. List A Title | is prior to Completion Date AND NOT choices 1, 2, 3, or 5 | DE - Section 2, List A Second Document Expiration Date -- List A second document expired before document completion date AI - List A Second Document (...title...) expired (...date...) before Completion Date. |
| 63 | List C Expiration Date VS. Completion Date VS. List C Title | is prior to Completion Date AND is choice 7 | DE - Section 2, List C Document Expiration Date -- List C document expired before document completion date AI - List C Document (...title...) expired (...date...) before Completion Date. |
| 64 | Completion Date | is blank | DE - Section 2, Employer Signature Date -- Document completed date is missing<br>AI - Document Completion Date is missing |
| 65 | Employment Date VS. Completion Date | is greater than 3 days after Employment Date | DE - Section 2, Employer Signature Date -- The date completed is more than 3 business days of when employee begins work. Verify dates on form.<br>SC - This I-9 was not completed within 3 business days of when employee begins work |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 66 | Completion Date VS. Section 1 Authorized Until Date | is greater than Work Expiration Date | DE - Section 1, Authorized To Work Until -- Work Expiration Date must not be expired at the time employer signs Section 2<br>AI - Work Expiration Date was expired at the time employer signed Section 2 |
| 67 | Representative Signature | is not present | DE - Section 2, Employer Signature -- Authorized Representative signature is missing.<br>AI - Authorized Representative signature is missing. |
| 68 | Representative Name | is blank | DE - Section 2, Employer Name -- Authorized Representative Name is not complete<br>AI - Authorized Representative Name is missing |
| 69 | Representative Title | is blank | DE - Section 2, Employer Title -- Authorized Representative Title is not complete<br>AI - Authorized Representative Title is missing |
| 70 | Business Name | is blank | DE - Section 2, Business Name -- Business Name is not complete<br>AI - Business Name is missing |
| 71 | Business Address | is blank | DE - Section 2, Business Address -- Business Address is not complete<br>AI - Business Address is missing |
| 72 | New Name | not verified | |

TABLE III: RULES FOR COMPLIANCE ANALYSIS

| | Field | Condition | Message (DE = Data Entry, AI = Additional Information, SC = Statement of Completion) |
|---|---|---|---|
| 73 | Rehire Date VS. Rehire Confirmation Override | is not blank AND NOT overridden | DE - Section 3, Rehire Date -- Use this section if employee is being hired within 3 years of the original date of hire. Use it to update or reverify employment eligibility. Do not use this date field for an update of continuing employment. Please confi |
| 74 | First Reverification Document Title VS. Number VS. First Reverification Expiration Date | is blank AND (is supplied OR is supplied) | DE - Section 3, First Reverification Document Title -- First Reverification Document Title is Missing--If reverifying, only an employee eligibility document from Section 2 List A or C is required AI - First Reverification Document Title is Missing--If rev |
| 75 | First Reverification Document Number VS. Title VS. First Reverification Expiration Date | is blank AND (is supplied OR is supplied) | DE - Section 3, First Reverification Document Number -- First Reverification Document Number needs to be completed AI - First Reverification Document Number is missing |
| 76 | First Reverification Document Title VS. First Reverification Number | is choice 5 and length is 10 or (starts with "A" and length is 9) or (starts without "A" and length is 8) | DE - Section 3, First Reverification Document Number -- Alien Registration Number must be 8 or 9 digits and start with an 'A' AI - Reverification Document Number must be 8 or 9 digits for an Alien Registration Card |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 77 | First Reverification Expiration Date VS. First Reverification Title | is blank AND NOT choice 1,2, 3, or 5 | DE - Section 3, First Reverification Document Expiration Date -- First Reverification Document Expiration Date needs to be completed AI - First Reverification Document (...title...) Expiration Date is missing |
| 78 | First Reverification Expiration Date | is prior to current date AND NOT choice is 1, 2, 3, or 5 | DE - Section 3, First Reverification Document Expiration Date -- First Reverification Document Expiration Date has expired AI - First Reverification Document (...title...) has expired (...date...) |
| 79 | First Reverification Expiration Date VS. First Reverification Title VS. Override Alien | is blank AND is choice 5 AND NOT overridden | DE - Section 3, First Reverification Document Expiration Date -- First Reverification Document Expiration Date needs to be completed AI - First Reverification Document Expiration Date needs to be completed |
| 80 | First Reverification Expiration Date | is not blank AND NOT choice 1,2,3, or 5 | Tracking--will show up on Expiring Employment Documents Report 120 days prior to expiration |
| 81 | First Reverification Expiration Date VS. Rehire Date | is prior to Rehire Date | DE - Section 3, First Reverification Document Expiration Date -- First Reverification document expired before reverification date AI - First Reverification Document (...title...) expired (...date...) before Reverification Date (...date...) |

TABLE III: RULES FOR COMPLIANCE ANALYSIS

| | Field | Condition | Message (DE = Data Entry, AI = Additional Information, SC = Statement of Completion) |
|---|---|---|---|
| 82 | Second Reverification Document Title VS. Second Reverification Number VS. Second Reverification Expiration Date | is blank AND (is supplied OR is supplied) | DE - Section 3, Second Reverification Document Title -- Second Reverification Document Title is Missing--If reverifying, only an employee eligibility document from Section 2 List A or C is required AI - Second Reverification Document Title is Missing--If |
| 83 | Second Reverification Document Number VS. Title VS. Second Reverification Expiration Date | is blank AND (is supplied OR is supplied) | DE - Section 3, Second Reverification Document Number, Second Reverification Document Number needs to be completed AI - Second Reverification Document Number is missing |
| 84 | Second Reverification Expiration Date VS. Second Reverification Title | is blank AND is choice 7 | DE - Section 3, Second Reverification Document Expiration Date, Second Reverification Document Expiration Date needs to be completed AI - Second Reverification Document (...title...) Expiration Date is missing |
| 85 | Second Reverification Expiration Date | is prior to current date AND is choice 7 | DE - Section 3, Second Reverification Document Expiration Date, Second Reverification Document Expiration Date has expired AI - Second Reverification Document (...title...) has expired (...date...) |
| 86 | Second Reverification Expiration Date | is not blank AND is choice 7 | Tracking--will show up on Expiring Employment Documents Report 120 days prior to expiration |
| | | | |

TABLE III: RULES FOR COMPLIANCE ANALYSIS

| | Field | Condition | Message (DE = Data Entry, AI = Additional Information, SC = Statement of Completion) |
|---|---|---|---|
| 87 | Second Reverification Expiration Date VS. Rehire Date | is prior to Rehire Date | DE - Section 3, Second Reverification Document Expiration Date -- Second Reverification document expired before reverification date AI - Second Reverification Document (...title...) expired (...date...) before Reverification Date (...date...) |
| 88 | Representative Signature | is not present | DE - Section 3, Authorized Representative Signature -- Authorized Representative signature is missing AI - Authorized Representative signature is missing |
| 89 | Section 3 Completion Date VS. First Updated Document Fields VS. Second Updated Document Fields | is blank AND (is NOT blank OR is NOT blank) | DE - Section 3, Authorized Representative Signature -- Completion Date is not completed AI - Section 3 Completion Date is missing |
| 90 | Section 3 Completion Date VS. Reverification Date | is greater than the Rehire Date | DE - Section 3, Authorized Representative Signature -- The Section 3 Completion Date is not the same as the reverification date. Verify dates on form. Section 3 must be completed on the day of rehire by the employer. Failure to do so is a violation. D |
| 91 | Section 3 Completion Date VS. Reverification Document Title | is prior to 9/30/97 and is choice 2,3,8, or 9 | DE - Section 3, Reverification Document Title -- Reverification Document type no longer acceptable after a Section 3 Completion date of 09/30/97 AI - Reverification Document (...title...) no longer acceptable after a Section 3 Completion Date of 09/30/97. Ei |

TABLE III: RULES FOR COMPLIANCE ANALYSIS

| | Field | Condition | Message (DE = Data Entry, AI = Additional Information, SC = Statement of Completion) |
|---|---|---|---|
| 92 | Rehire Date VS. Section 3 Completion Date VS. Section 2 List A first Expiration Date VS. Section 2 List A Title | is blank AND is NOT blank AND NOT choice 1,2, or 3 AND first section 2 expiration date expired before section 3 completion date | DE - Section 3, Authorized Representative Signature Date -- The Section 2 List A First Document Number has expired prior to Section 3 Completion Date--Verify dates on form. SC - This I-9 Section 3 was not completed prior to expiration of the original Sect |
| 93 | Rehire Date VS. Section 3 Completion Date VS. Section 2 List C Expiration Date VS. Section 2 List C Title | is blank AND is NOT blank AND is choice 7 AND section 2 expiration date expired before section 3 completion date | DE - Section 3, Authorized Representative Signature Date -- The Section 2 List C Document Number has expired prior to Section 3 Completion Date--Verify dates on form. SC - This I-9 Section 3 was not completed prior to expiration of the original Section 2 |
| 94 | Rehire Date VS. Section 3 Completion Date VS. first Reverification Document List VS. second Reverification Document List | (is not blank OR is not blank) AND first list is blank AND second list is blank | DE - Section 3, Rehire Date -- Need a Reverification Document from either list--Reverification document type should be a List A or C document only because identity is established in Section 2 AI - Need a Reverification Document from either list--Reverific |
| 95 | Employee Terminated | is checked | DE - Employee terminated. Employer must retain I-9 for 3 years from date of hire or one year from date of termination, whichever is greater. AI - will no longer report on additional information requests. SC - Employee terminated. Employer must retain I- |

TABLE III: RULES FOR COMPLIANCE ANALYSIS

| Lists of Acceptable Documents | | |
|---|---|---|
| List A (Documents that Establish Both Identity and Employment Eligibility) | List B (Documents that Establish Identity) | List C (Documents that Establish Employment Eligibility) |
| 1. U.S. Passport (unexpired or expired) | 1. Driver's license or ID card issued by a state or outlying possession of the United States provided it contains a photograph or information such as name, date of birth, sex, height, eye color, and address | 1. U.S. social security card issued by the Social Security Administration (other than a card stating it is not valid for employment) |
| 2. Certificate of U.S. Citizenship (INS Form N-560 or N-561) | 2. ID card issued by federal, state, or local government agencies or entities provided it contains a photograph or information such as name, date of birth, sex, height, eye color, and address | 2. Certification of Birth Abroad issued by the Department of State (Form FS-545 or Form DS-1350) |
| 3. Certificate of Naturalization (INS Form N-550 or N-570) | 3. School ID card with a photograph | 3. Original or certified copy of a birth certificate issued by a state, county, municipal authority or outlying possession of the United States bearing an official seal |

TABLE III: RULES FOR COMPLIANCE ANALYSIS

| | | |
|---|---|---|
| 4. Unexpired foreign passport, with I-551 stamp or attached INS Form I-94 indicating unexpired employment authorization | 4. Voter's registration card | 4. Native American tribal document |
| 5. Alien Registration Receipt Card with photograph (INS Form I-151 or I-551) | 5. U.S. Military card or draft record | 5. U.S. Citizen ID Card (INS Form I-197) |
| 6. Unexpired Temporary Resident Card (INS Form I-688) | 6. Military dependent's ID card | 6. ID Card for use of Resident Citizen in the United States (INS Form I-179) |
| 7. Unexpired Employment Authorization Card (INS Form I-688A) | 7. U.S. Coast Guard Merchant Mariner Card | 7. Unexpired employment authorization document issued by the INS (other than those listed under List A) |
| 8. Unexpired Reentry Permit (INS Form I-327) | 8. Native American tribal document | |
| 9. Unexpired Refugee Travel Document (INS Form I-571) | 9. Driver's license issued by a Canadian government authority | |
| 10. Unexpired Employment Authorization Document issued by the INS which contains a photograph (INS Form I-688B) | For persons under age 18 who are unable to present a document listed above: | |
| | 10. School record or report card | |
| | 11. Clinic, doctor, or hospital record | |
| | 12. Day-care or nursery school record | |

TABLE IV: ALERTS

| | I-9 Alerts | | |
|---|---|---|---|
| | Field | Condition | Message (DE = Data Entry, AI = Additional Information, SC = Statement of Completion) |
| 1 | Section 2, List B Title | is "Other" | Please call the office to clarify how to handle this situation. |
| 2 | Section 2, List C Title | is "US Birth Certificate" | Please be aware that this is to be a certified copy of a birth certificate, not a hospital receipt. |
| 3 | Section 2, List C Title | is "Other" | Please call the office to clarify how to handle this situation. |
| 4 | Section 2, List A Title | is "Alien Registration Card" and expiration date is blank | Not all alien registration cards have expiration dates. Confirm if card was unexpired when presented and that the photo on the card relates to the individual presenting the card. Additionally, INS Form I-151 is no longer acceptable after March 30th, 1996. |
| 5 | Section 2, List A First Document Expiration Date | is blank and List A Title is "Alien Registration Card" | Not all alien registration cards have expiration dates. Confirm if card was unexpired when presented and that the photo on the card relates to the individual presenting the card. Additionally, INS Form I-151 is no longer acceptable after March 30th, 1996. |
| 6 | Section 3, List A Title | is "Alien Registration Card" and expiration date is blank | Not all alien registration cards have expiration dates. Confirm if card was unexpired when presented and that the photo on the card relates to the individual presenting the card. Additionally, INS Form I-151 is no longer acceptable after March 30th, 1996. |

TABLE IV: ALERTS

| | | | |
|---|---|---|---|
| 7 | Section 3, List A Document Expiration Date | is blank and List A Title is "Alien Registration Card" | Not all alien registration cards have expiration dates. Confirm if card was unexpired when presented and that the photo on the card relates to the individual presenting the card. Additionally, INS Form I-151 is no longer acceptable after March 30th, 1996. |
| 8 | Section 2, Completion Date | is not blank | The employer must look at the actual documents presented to verify that they appear to be genuine and to relate to the employee. |
| 9 | Section 1, Social Security Number | starts with a "9" | Any Social Security Number that starts with a '9' is not a valid number. |
| 10 | Section 1, Preparer Name | is blank | Please refer to the associated Tip in regards to filling out this section. |
| 11 | Section 1, Preparer Address | is blank | Please refer to the associated Tip in regards to filling out this section. |
| 12 | Section 1, Preparer Date | is blank | Please refer to the associated Tip in regards to filling out this section. |
| 13 | Section 3, New Name | is not blank | Use of the name change field is typically used for a name change only. No other portion of Section 3 needs to be completed unless the employees identity must be reestablished or in the case of rehire. |
| 14 | Section 2, List A Title | is a "Foreign Passport with I-94 Card" choice and List A Issuing Authority is not "Foreign Passport" | For Foreign Passport verification, please list the Foreign Passport details first. Additionally, the I-94 Card may not be valid for employment. If valid for employment, employee status may be extended 240 days with a timely filed application for extension. |

TABLE IV: ALERTS

| | | | |
|---|---|---|---|
| 15 | Section 2, List A Issuing Authority | is not "Foreign Passport" and List A Title is a "Foreign Passport with I-94 Card" choice | For Foreign Passport verification, please list the Foreign Passport details first. Additionally, the I-94 Card may not be valid for employment. If valid for employment, employee status may be extended 240 days with a timely filed application for extension. |
| 16 | Section 1, Alien Authorized To Work Until | is chosen | Please be aware that the I-94 Card may not be valid for employment. If valid for employment, employee status may be extended 240 days with a timely filed application for extension. |
| 17 | Section 3, First Document Title | is a "Foreign Passport with I-94 Card" choice | For Foreign Passport verification, please list the I-94 details in section C. Additionally, the I-94 Card may not be valid for employment. If valid for employment, employee status may be extended 240 days with a timely filed application for extension. |
| 18 | Section 2, List A Title | is a "Foreign Passport with IAP-66 Card" choice | For Foreign Passport verification, please list the Foreign Passport details first. J (Exchange Visitors) students should present in section A a combination of an unexpired Foreign passport, an unexpired I-94 card reflecting J-1 classification and an unexpired Form IAP-66. The IAP-66 and the I-94 may both bear expiration dates (D/S refers to the duration of time necessary to complete the approved exchange program). Record here at second expiration date field the IAP-66 expiration date. (This date will be tracked). Employers should record the I-94 admission number and expiration, if any, in writing on the I-9 form in section A. |
| 19 | Section 3, First Document Title | is a "Foreign Passport with IAP-66 Card" choice | For Foreign Passport verification, please list the IAP-66 details in section C. J |

TABLE IV: ALERTS

| | | | |
|---|---|---|---|
| | | | (Exchange Visitors) students should present in a combination of an unexpired Foreign passport, an unexpired I-94 card reflecting J-1 classification and an unexpired Form IAP-66. The IAP-66 and the I-94 may both bear expiration dates (D/S refers to the duration of time necessary to complete the approved exchange program). Record here in expiration date field the IAP-66 expiration date. (This date will be tracked). Employers should record the I-94 admission number and expiration, if any, in writing on the I-9 form in section C. |
| 20 | Section 2, List A Title | is a "Foreign Passport with I-20a/b Card" choice | For Foreign Passport verification, please list the Foreign Passport details first. F (University or college) students should present a combination of an unexpired foreign passport, an unexpired I-94 card reflecting F-1 or M-1 classification and an unexpired I-20ab document (D/S refers to period of time necessary to complete approved academic or training program). The I-20ab should be endorsed for the employment by the designated school official and include a period of time during which the employment may take place bear a work authorization expiration date. The I-94 card is usually marked with D/S (Duration of status). Record here at second expiration date field the IAP-66 endorsement expiration date (work authorization rarely corresponds with duration of I-20 except for on campus employment). This date will be tracked. |

TABLE IV: ALERTS

|   |   |   |   |
|---|---|---|---|
|   |   |   | Employers should record the I-94 admission number in writing on the I-9 form in sect A. |
| 21 | Section 3, First Document Title | is a "Foreign Passport with I-20a/b Card" choice | For Foreign Passport verification, please list the I-20a/b details in section C. F (University or college) students should present a combination of an unexpired foreign passport, an unexpired I-94 card reflecting F-1 or M-1 classification and an unexpired I-20ab document (D/S refers to period of time necessary to complete approved academic or training program). The I-20ab should be endorsed for the employment by the designated school official and include a period of time during which the employment may take place bear a work authorization expiration date. The I-94 card is usually marked with D/S (Duration of status). Record here in expiration date field the IAP-66 endorsement expiration date (work authorization rarely corresponds with duration of I-20 except for on campus employment). This date will be tracked. Employers should record the I-94 admission number in writing on the I-9 form in sect C. |
| 22 | Section 2, List A Title | is a "Foreign Passport" choice other than I-94 and List A Issuing Authority is not "Foreign Passport" | For Foreign Passport verification, please list the Foreign Passport details first. |
| 23 | Section 2, List A Issuing Authority | is not "Foreign Passport" and List A Title is a "Foreign Passport" other than I-94 choice | For Foreign Passport verification, please list the Foreign Passport details first. |
| 24 | Section 3, First Document Title | is a "Foreign Passport with I-551 Card" choice | For Foreign Passport verification, please list the I-551 details in section C. |

TABLE V: TIPS

| ID | Field | Message |
|---|---|---|
| 1 | Section 1, Last Name value | In section 1, ensure that the individual hired or recruited or referred for a fee provides his or her printed name. Failure to do so is a substantive verification failure. (See Memorandum, March 6, 1997; Interim Guidelines: Section 274A(b)(6) of the Immigration and Nationality Act Added by Section 411 of the Illegal Immigration Reform & Immigrant Responsibility Act of 1996) Go to www.lookoutservices.net/legal memorandum and resources. |
| 2 | Section 1, First name | In section 1, ensure that the individual hired or recruited or referred for a fee provides his or her printed name. Failure to do so is a substantive verification failure. (See Memorandum, March 6, 1997; Interim Guidelines: Section 274A(b)(6) of the Immigration and Nationality Act Added by Section 411 of the Illegal Immigration Reform & Immigrant Responsibility Act of 1996) Go to www.lookoutservices.net/legal memorandum and resources. |
| 3 | Section 1, Middle Initial | In section 1, ensure that the individual hired or recruited or referred for a fee provides his or her printed name. Failure to do so is a substantive verification failure. (See Memorandum, March 6, 1997; Interim Guidelines: Section 274A(b)(6) of the Immigration and Nationality Act Added by Section 411 of the Illegal Immigration Reform & Immigrant Responsibility Act of 1996) Go to www.lookoutservices.net/legal memorandum and resources. |
| 4 | Section 1, Maiden Name | In section 1, ensure that the individual hired or recruited or referred for a fee provides his or her printed name. Failure to do so is a substantive verification failure. (See Memorandum, March 6, 1997; Interim Guidelines: Section 274A(b)(6) of the Immigration and Nationality Act Added by Section 411 of the Illegal Immigration Reform & Immigrant Responsibility Act of 1996) Go to www.lookoutservices.net/legal memorandum and resources. |

What is claimed is:

1. A method for assisting in documenting employment eligibility using a data processing system, comprising:
   displaying a first field of an employment eligibility verification document and a second field of the employment eligibility verification document;
   receiving or providing first time data corresponding to the first field;
   receiving or providing second time data corresponding to the second field;
   comparing, using the data processing system, a first time value, which includes or is based at least in part on the first time data, to a second time value, which includes or is based at least in part on the second time data; and
   displaying predetermined text based at least in part on an outcome of comparing the first time value to the second time value.

2. The method of claim 1 wherein the first time data comprises a signature date.

3. The method of claim 1 wherein the second time data comprises an expiration date.

4. The method of claim 1 wherein the second time data includes an expiration date for an employee's original document.

5. The method of claim 1 wherein the first time data includes a signature date of an employer.

6. The method of claim 1 wherein the outcome comprises determining if a signature date of an employer is more than a predetermined number of days from when an employee begins work for the employer.

7. The method of claim 1 wherein the outcome comprises determining if a future expiration date is within a predetermined time period of a current date.

* * * * *

UNITED STATES PATENT AND TRADEMARK OFFICE
CERTIFICATE OF CORRECTION

PATENT NO. : 8,762,287 B2
APPLICATION NO. : 12/824479
DATED : June 24, 2014
INVENTOR(S) : Elaine V. Morley et al.

Page 1 of 1

It is certified that error appears in the above-identified patent and that said Letters Patent is hereby corrected as shown below:

On the Title Page

Related US Application Data:

item (63)    Continuation of application No. 10/779,274, filed on Feb. 13, 2004, now Pat. No. 7,747,542.

Is corrected to:

item (63)    Continuation of application No. 10/779,274, filed on Feb. 13, 2004, now Pat. No. 7,747,542, which is a continuation of application No. 09/918,092, filed on Jul. 30, 2001, now abandoned.

item (60)    Provisional application No. 60/222,117, filed Jul. 28, 2000.

Signed and Sealed this
Twenty-first Day of October, 2014

Michelle K. Lee
*Deputy Director of the United States Patent and Trademark Office*